United States Patent
Farris

(10) Patent No.: US 11,375,847 B2
(45) Date of Patent: *Jul. 5, 2022

(54) STILL BEVERAGE BREWING METHOD

(71) Applicant: Red River Tea Company, Dallas, TX (US)

(72) Inventor: Jeff Farris, Argyle, TX (US)

(73) Assignee: RED RIVER TEA COMPANY, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,653

(22) Filed: Jun. 26, 2019

(65) Prior Publication Data

US 2019/0313836 A1    Oct. 17, 2019

Related U.S. Application Data

(63) Continuation of application No. 14/687,567, filed on Apr. 15, 2015, now Pat. No. 10,342,378.

(60) Provisional application No. 61/980,395, filed on Apr. 16, 2014.

(51) Int. Cl.
  *A47J 31/41*   (2006.01)
  *A23L 2/54*    (2006.01)

(52) U.S. Cl.
  CPC .............. *A47J 31/41* (2013.01); *A23L 2/54* (2013.01)

(58) Field of Classification Search
  CPC .................... A47J 31/41; A23L 2/54
  See application file for complete search history.

(56) References Cited

U.S. PATENT DOCUMENTS

| | | | | |
|---|---|---|---|---|
| 2,682,984 A | * | 7/1954 | McLikian | G07F 13/065 221/96 |
| 3,426,670 A | * | 2/1969 | Wittern | A47J 31/408 99/298 |
| 3,446,137 A | * | 5/1969 | Modjeski | A47J 31/40 99/289 R |
| 4,009,289 A | | 2/1977 | Roos et al. | |

(Continued)

FOREIGN PATENT DOCUMENTS

| CN | 102919743 | 2/2013 |
|---|---|---|
| JP | 2004131407 | 4/2004 |

(Continued)

OTHER PUBLICATIONS

English Translation for CN102919743 published Feb. 2013.

*Primary Examiner* — Anthony J Weier
(74) *Attorney, Agent, or Firm* — Klemchuk LLP

(57) ABSTRACT

Systems and methods for brewing still beverages in commercial environments are provided. A brewing machine ordinarily used for brewing tea or coffee may be utilized to brew a still beverage. A pre-prepared still beverage mixture may be added to a brew basket or filter within the brewing machine. The brewing machine may then be activated. Water may flow through or be added to the pre-prepared still beverage mixture as it exits the brew basket or filter and enters a dispenser or reservoir. Sweeteners, flavorings and/or pulp may be added to the pre-prepared still beverage mixture as it enters the dispenser or reservoir. This may change the flavor, intensity, texture, and/or taste of the brewed still beverage according to the needs of the operator or the preferences of those who will drink the brewed still beverage.

20 Claims, 5 Drawing Sheets

(56) References Cited

U.S. PATENT DOCUMENTS

| | | | |
|---|---|---|---|
| H859 H | 12/1990 | Augustine | |
| 5,265,518 A * | 11/1993 | Reese | A47J 31/32 |
| | | | 99/280 |
| 5,579,678 A * | 12/1996 | Goerndt | A23F 3/163 |
| | | | 426/597 |
| 5,724,883 A * | 3/1998 | Usherovich | A47J 31/057 |
| | | | 426/433 |
| 5,941,163 A * | 8/1999 | Park | A47J 31/40 |
| | | | 99/286 |
| 6,019,032 A | 2/2000 | Arksey | |
| 6,149,035 A | 11/2000 | Gorski et al. | |
| 6,240,829 B1 | 6/2001 | McGarrah | |
| 7,507,430 B2 | 3/2009 | Stearns et al. | |
| 8,162,210 B2 | 4/2012 | McInerney et al. | |
| 10,045,654 B2 * | 8/2018 | Burrows | A47J 31/3628 |
| 2003/0072859 A1 | 4/2003 | Priley | |
| 2007/0039479 A1 | 2/2007 | Dalton et al. | |
| 2009/0277516 A1 | 11/2009 | Winkler et al. | |
| 2009/0285966 A1 | 11/2009 | Tso et al. | |
| 2010/0126354 A1 * | 5/2010 | Mahlich | A47J 31/4485 |
| | | | 99/293 |
| 2010/0199850 A1 | 8/2010 | Koopman et al. | |
| 2010/0247714 A1 * | 9/2010 | Massey | A23F 3/163 |
| | | | 426/78 |
| 2010/0307930 A1 | 12/2010 | Zagerle | |
| 2011/0041702 A1 | 2/2011 | Yoakim et al. | |
| 2011/0185913 A1 * | 8/2011 | Webster | A47J 31/02 |
| | | | 99/316 |
| 2011/0217420 A1 * | 9/2011 | Lerner | A23F 5/46 |
| | | | 426/78 |
| 2012/0312174 A1 | 12/2012 | Lambert | |
| 2013/0071532 A1 | 3/2013 | Pribus et al. | |
| 2014/0007776 A1 * | 1/2014 | Mori | A47J 31/3633 |
| | | | 99/289 R |
| 2014/0314913 A1 * | 10/2014 | Stewart | A47J 31/002 |
| | | | 426/78 |
| 2014/0342069 A1 * | 11/2014 | Tinkler | A47J 31/407 |
| | | | 426/425 |
| 2015/0056340 A1 * | 2/2015 | Trombetta | B65D 85/8043 |
| | | | 426/115 |
| 2015/0239655 A1 | 8/2015 | Schroeder et al. | |
| 2015/0257585 A1 * | 9/2015 | Windler | A47J 31/3638 |
| | | | 248/311.2 |
| 2016/0220060 A1 * | 8/2016 | Clark | A23L 2/60 |
| 2017/0042364 A1 * | 2/2017 | Crarer | A47J 31/3638 |
| 2017/0172338 A1 * | 6/2017 | Burrows | A47J 31/3695 |

FOREIGN PATENT DOCUMENTS

| | | |
|---|---|---|
| WO | WO9014772 | 12/1990 |
| WO | WO05105607 | 11/2005 |

* cited by examiner

STILL BEVERAGE BREWING METHOD

CROSS-REFERENCE TO RELATED APPLICATIONS

The present application is a continuation of U.S. patent application Ser. No. 14/687,567 filed Apr. 15, 2015, now U.S. Pat. No. 10,342,378, which is a non-provisional of and claims priority to U.S. Patent Application No. 61/980,395 filed Apr. 16, 2014, entitled "Lemonade Brewing System and Method," both of which are hereby incorporated by referenced in their entirety.

FIELD OF THE DISCLOSURE

The present disclosure generally relates to beverage brewing systems and methods, and more particularly to still beverage brewing systems and methods.

BACKGROUND

Freshly made lemonade has become a popular beverage in fast food restaurants, such as Chic-fil-A®. This type of freshly made lemonade is generally prepared on site by cutting lemons, juicing them, adding sugar and water, and blending. This can present a challenge for certain commercial environments, such as convenience stores and restaurants, to replicate given the time and resources required to do so.

SUMMARY

Embodiments of the present disclosure may provide systems and methods for brewing still beverages, such as lemonade, in commercial environments. A brewing machine that may be utilized for brewing tea or coffee may be utilized to brew still beverages using systems and methods according to embodiments of the present disclosure.

Embodiments of the present disclosure may provide a method for brewing a still beverage in a brewing machine, the method comprising: adding a pre-prepared still beverage mixture to a brew basket within the brewing machine; and flowing water through the pre-prepared still beverage mixture wherein the still beverage formed from combining the pre-prepared still beverage mixture and water fully evacuates the brew basket and enters a reservoir as a homogenous mixture. The method also may comprise adding one or more additional components to the pre-prepared still beverage mixture as it enters the reservoir. The one or more additional components may be selected from the group comprising: sweeteners, flavorings, pureed fruit, and pulp. The still beverage may be lemonade, and the pre-prepared still beverage mixture may be comprised of lemons and water. The pre-prepared still beverage mixture may be further comprised of a gum-based addition that causes the pre-prepared still beverage mixture to melt faster when water flows through the pre-prepared still beverage mixture. The pre-prepared still beverage mixture may be in frozen form before being added to the brew basket. The pre-prepared still beverage mixture may be in an encapsulated form before being added to the brew basket. The pre-prepared still beverage mixture may be in a slurry form before being added to the brew basket. The still beverage may be selected from the group comprising: lemonade, a fruit drink, coconut water, an isotonic, and horchata.

Other embodiments of the present disclosure may provide a method for brewing a still beverage in a brewing machine, the method comprising: adding a pre-prepared still beverage mixture to a brew basket within the brewing machine; and adding water to the pre-prepared still beverage mixture as it exits the brew basket and enters a reservoir. The method also may comprise adding one or more additional components to the pre-prepared still beverage mixture as it enters the reservoir. The one or more additional components may be selected from the group comprising: sweeteners, flavorings, pureed fruit, and pulp. The method also may comprise combining a sweetener with water to be added to the pre-prepared still beverage mixture. The pre-prepared still beverage mixture may be further comprised of a gum-based addition that causes the pre-prepared still beverage mixture to melt faster when water is added to the pre-prepared still beverage mixture. The pre-prepared still beverage mixture may be in frozen form before being added to the brew basket.

Additional embodiments of the present disclosure may provide a method for brewing lemonade in a brewing machine, the method comprising: adding a pre-prepared lemonade mixture to a brew basket within the brewing machine, the pre-prepared lemonade mixture comprised of lemons and water in a gelatinized form; and flowing water through the pre-prepared lemonade mixture wherein the water melts the pre-prepared lemonade mixture as it evacuates the brew basket and enters a reservoir as a homogenous mixture. The pre-prepared lemonade mixture may further comprise one or more of the following: flavorings, pulp, sweeteners, and pureed fruit. The pre-prepared lemonade mixture may further comprise a gum-based addition that accelerates the melting of the pre-prepared lemonade mixture as it evacuates the brew basket. The method may further comprise adding one or more additional components to the pre-prepared lemonade mixture as it enters the reservoir, the one or more additional components selected from the group comprising: flavorings, pulp, sweeteners, and pureed fruit.

When the brewed still beverage is lemonade, it should be appreciated that the pre-prepared lemonade mixture, regardless what form it may take, may be comprised of lemons and water, thereby making it a fresh-brewed lemonade as opposed to a powder or other artificial mixtures that may be presently available to prepare lemonade in commercial settings. The pre-prepared lemonade mixture also may include flavorings, pulp, and/or pureed fruit to enhance the taste and flavor of the resultant brewed lemonade. The pre-prepared lemonade mixture also may include gum-based additions that may make the resultant brewed lemonade more palatable and also may cause the pre-prepared lemonade mixture to melt faster when hot water flows through the brew basket during the brewing process or when water combines with the pre-prepared lemonade mixture in the dispenser. It should be appreciated that the tartness and/or sweetness levels of the resultant brewed lemonade may be selectively adjusted to accommodate the tastes and preferences of those likely to consume the brewed lemonade without departing from the present disclosure.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
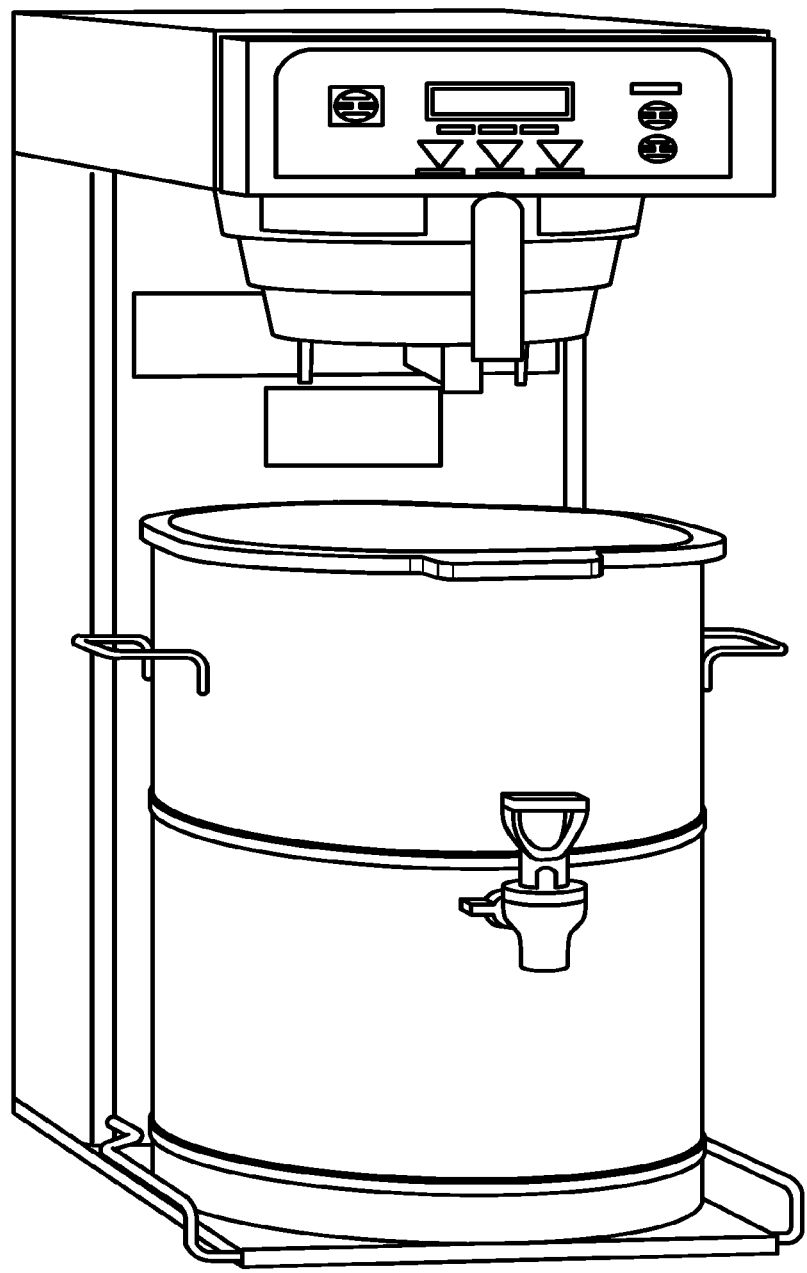
FIG. 1 depicts a brewing machine with a dispenser to receive a still beverage as it is brewed according to an embodiment of the present disclosure.

Embodiments of the present disclosure may provide systems and methods for brewing still beverages, such as lemonade, in commercial environments, including but not limited to, convenience stores and restaurants. A brewing machine that may be utilized for brewing tea or coffee may be utilized to brew still beverages, such as lemonade, using systems and methods according to embodiments of the present disclosure.

In an embodiment of the present disclosure, a pre-prepared lemonade mixture may be added to a brew basket or filter within the brewing machine. The brewing machine may then be activated, such as by activating an on switch or utilizing another input mechanism that may be provided on a user interface. Water may flow through or be added to the pre-prepared lemonade mixture as it exits the brew basket or filter and enters a dispenser or reservoir. In some embodiments of the present disclosure, sweeteners, flavorings and/or pulp may be added to the pre-prepared lemonade mixture as it enters the dispenser or reservoir. This may change the flavor, intensity, texture, and/or taste of the brewed lemonade according to the needs of the operator or the preferences of those who will drink the brewed lemonade. The resulting product is a still beverage that fully evacuates from the brew basket or filter but does not melt through the brew basket or filter too quickly, thereby creating a homogeneous mixture once brewed.

It should be appreciated that the pre-prepared lemonade mixture, regardless what form it may take, may be comprised of lemons and water, thereby making it a fresh-brewed lemonade as opposed to a powder or other artificial mixtures that may be presently available to prepare lemonade in commercial settings. In some embodiments of the present disclosure, the pre-prepared lemonade mixture also may include flavorings, pulp, and/or pureed fruit to enhance the taste and flavor of the resultant brewed lemonade. In embodiments of the present disclosure, the pre-prepared lemonade mixture also may include gum-based additions that may make the resultant brewed lemonade more palatable and also may cause the pre-prepared lemonade mixture to melt faster when hot water flows through the brew basket during the brewing process or when water combines with the pre-prepared lemonade mixture in the dispenser. It should be appreciated that the tartness and/or sweetness levels of the resultant brewed lemonade may be adjusted depending on the preferences of the consuming public, such as within a particular geographical region. For example, the consuming public in the Southern United States generally may prefer sweeter brewed lemonade than the consuming public in the Northeast United States. Accordingly, the type or amount of sweetener may be selectively adjusted to accommodate the tastes and preferences of those likely to consume the brewed lemonade without departing from the present disclosure.

It should be appreciated that different types of brewing machines may be utilized without departing from the present disclosure. A brewing machine, including but not limited to a Bunn Infusion Iced Tea Brewer (ITB or ITCB), may be utilized. The brewing machine may be a machine that may ordinarily have brewed coffee or tea but may be adapted to brew a still beverage, such as lemonade, in some embodiments of the present disclosure. In other embodiments of the present disclosure, the brewing machine may be specially configured to brew still beverages, such as lemonade. In further or other embodiments of the present disclosure, a specially configured brew basket may be employed.

FIG. 1 depicts a brewing machine with a dispenser to receive the still beverage, such as lemonade, as it is brewed according to an embodiment of the present disclosure. As depicted in FIG. 1, the brewing machine may include a brew basket or filter that may ordinarily receive a tea or coffee bag or filter pack. It should be appreciated that the same brew basket or filter may be used in brewing a still beverage according to embodiments of the present disclosure; however, there may be embodiments of the present disclosure wherein the brew basket or filter may be modified to receive certain types of pre-prepared still beverage mixtures without departing from the present disclosure. The brew basket may include a funnel on the bottom that may allow the brewed still beverage to flow through to a serving device, such as a dispenser or reservoir. The serving device may receive the pre-prepared still beverage mixture once it has flowed through the brew basket or filter.

Figure 4:
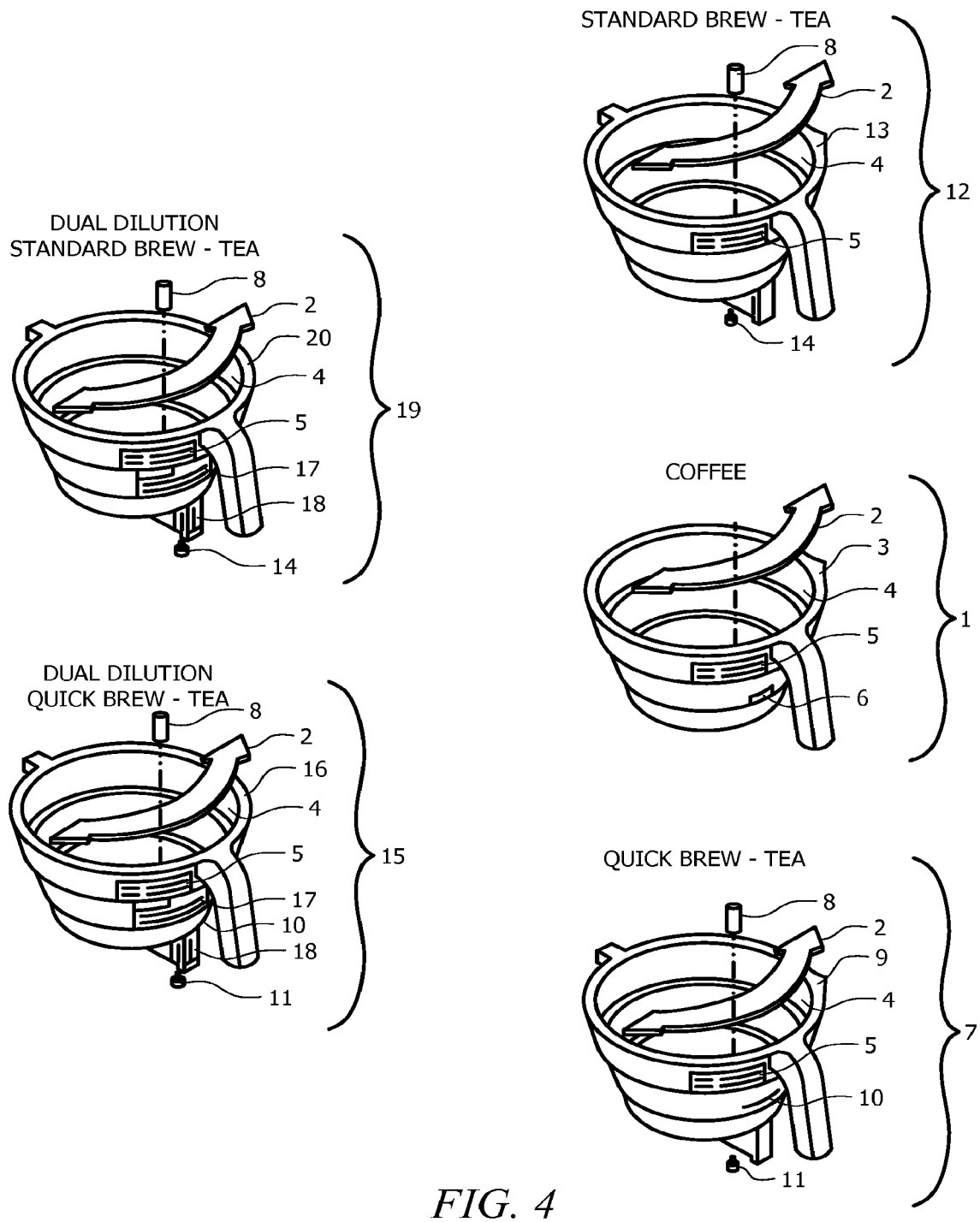
FIG. 4 depicts brew baskets for a brewing machine according to embodiments of the present disclosure.

In an embodiment of the present disclosure, the brew machine may include an empty brew basket having a funnel (such as one of the brew baskets depicted in FIG. 4) inserted into funnel rails positioned over a reservoir or dispenser into which the brewed lemonade will flow from the brew basket. The operator may place a pre-prepared still beverage mixture into the brew basket or filter. The funnel of the brew basket should be positioned to align the funnel discharge over the dispenser or reservoir. The operator may then select a batch size and other optional settings and then start the brewing process. The pre-prepared still beverage mixture may flow from the brew basket through the funnel or spout which in turns delivers the pre-prepared still beverage mixture to the dispenser where the brewed lemonade will be formed. As will be described in more detail below, the water feed line may deliver water through the brew basket or directly to the dispenser. Similarly, a sweetener line may dispense one or more ingredients forming the brewed still beverage either through the brew basket or directly to the dispenser without departing from the present disclosure. However, it should be appreciated that there may be some still beverages that may be brewed without use of a sweetener line according to embodiments of the present disclosure.

It should be appreciated that the pre-prepared still beverage mixture may assume a variety of forms according to embodiments of the present disclosure. In some embodiments of the present disclosure, the pre-prepared still beverage mixture may be placed into a paper or other flow-through mechanism that may be inserted into the brew basket. In some embodiments of the present disclosure, the pre-prepared still beverage mixture may be pre-packaged with the paper or other flow-through mechanism for direct insertion into the brew basket. However, there may be other embodiments of the present disclosure wherein the pre-prepared still beverage mixture may be placed directly into the brew basket without a paper or flow-through mechanism being inserted. In some embodiments of the present disclosure, the pre-prepared still beverage mixture may be provided in a frozen or encapsulated form that may be placed directly into the brew basket.

As discussed, in some embodiments of the present disclosure, the pre-prepared still beverage mixture may assume a frozen form before it is placed into the brew basket. In such embodiments of the present disclosure, it should be appreciated that the pre-prepared still beverage mixture may be flash frozen so that the pre-prepared still beverage mixture may be effectively stratified. In other embodiments of the present disclosure, the pre-prepared still beverage mixture may take the form of a gel or gelatin-type formulation that may be placed directly into the brew basket. A gel or gelatin-type formulation may be useful so that the pre-prepared still beverage mixture may be stored prior to use without requiring refrigeration, and this may be helpful in commercial scenarios, such as in convenience stores or restaurants, where refrigeration space may be at a premium. There may be other embodiments of the present disclosure wherein the pre-prepared still beverage mixture may be formed as an encapsulated fluid, such as may be utilized in bubble tea preparations, and the encapsulated fluid may be dropped into the brew basket. In other embodiments of the present disclosure, the pre-prepared still beverage mixture may take the form of a slurry that, when brewed, may fully evacuate the filter or brew basket but will not drop through the filter or brew basket too fast, thereby producing a homogeneous still beverage.

It should be appreciated that the strength of the still beverage to be brewed may be adjusted by utilizing more or less of the pre-prepared still beverage mixture. It also should be appreciated that more than one type of pre-prepared still beverage mixture may be utilized without departing from the present disclosure. Further, there may be embodiments of the present disclosure wherein more of a pre-prepared still beverage mixture (such as more than one encapsulated fluid or gel pack) may be utilized if a full batch of a still beverage is to be brewed (i.e., filling the entire dispenser), and less of the still beverage mixture (such as one encapsulated fluid or gel pack) may be utilized if a half batch of the still beverage is to be brewed (i.e., filling half of the dispenser).

Figure 2:
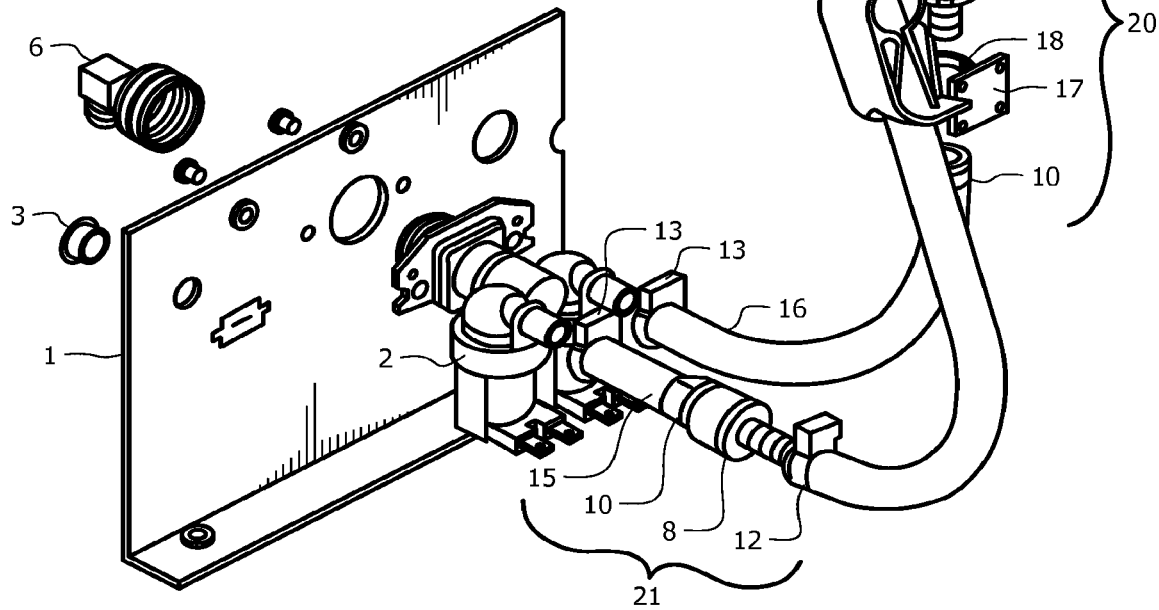
FIG. 2 depicts a water connection mechanism that may be attached to a brewing machine to provide water from a water system according to an embodiment of the present disclosure.

FIG. 2 depicts a water connection mechanism that may be attached to a brewing machine to provide water from a water system, such as a water tank or a tap, according to an embodiment of the present disclosure. In some embodiments of the present disclosure, the water connection mechanism may be coupled to the back of the brewing machine. In other embodiments of the present disclosure, the water connection mechanism may be coupled to the side of the brewing machine. In further embodiments of the present disclosure, the water connection mechanism may dispense water directly into the serving device without departing from the present disclosure. It should be appreciated that there may be some embodiments of the present disclosure wherein the water connection line may dispense heated water from a hot water tank such as through gravity feed when a valve is selectively opened (or is opened at a predetermined time), and there may be other embodiments of the present disclosure wherein the water may be heated after it leaves the tank but before it reaches the brew basket or dispenser.

Figure 3:
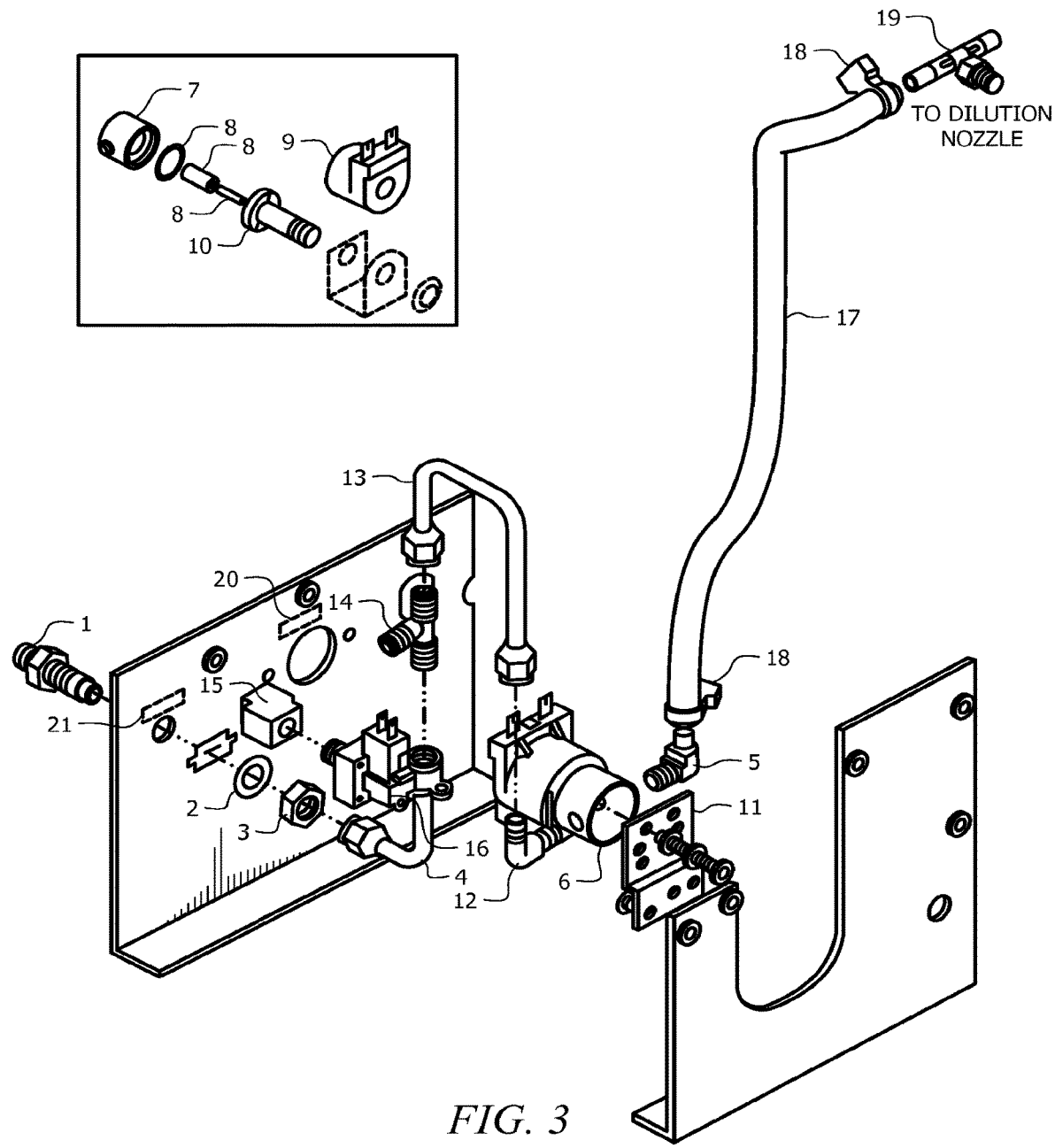
FIG. 3 depicts a sweetener line connection to a brewing machine according to an embodiment of the present disclosure.

In some embodiments of the present disclosure, the brewing machine may be equipped with a sweetener setting. This may allow an operator to adjust the level of sweetener depending on the preferences of the customers. There may be a separate inlet for sweetener, and it may use an existing $CO_2$ system or an external third-party pump for sweetener delivery according to some embodiments of the present disclosure. FIG. 3 depicts a sweetener line connection to a brewing machine according to an embodiment of the present disclosure. A variety of sweeteners may be employed as part of the brewed still beverage system according to embodiments of the present disclosure. The sweetener may come in a variety of forms including but not limited to, in liquid form, in powder form, in syrup form and combinations thereof. It also should be appreciated that natural sweeteners and/or artificial sweeteners may be employed without departing from the present disclosure. The sweetener may be housed in a reservoir, such as a box of pre-measured sweetener. In some embodiments of the present disclosure, water may be combined with the sweetener before it is delivered through to the brew basket or the reservoir. In other embodiments of the present disclosure, a water supply line may be coupled to a sweetener line, thereby providing a pressurized water feed that may draw the sweetener from a sweetener reservoir and mix it with water.

In some embodiments of the present disclosure, when sweetener is to be employed in brewing a still beverage, such as lemonade, the brewing machine may include a button or other input wherein the operator selects the input to include sweetener. There may be embodiments of the present disclosure wherein the operator may adjust the type or amount of sweetener through one or more inputs. For example, there may be some embodiments of the present disclosure wherein an operator may opt for inclusion of cane sugar as a sweetener for a brewed still beverage; however, there may be other embodiments of the present disclosure wherein an artificial sweetener may be employed to brew a lower calorie brewed still beverage. Different sweetener selections also may be provided by selectively changing the feed line to the brewing machine. However, there may be other embodiments wherein more than one feed line may be attached to the brewing machine so that the operator may select an input to opt for different types of sweeteners depending on the type of still beverage to be brewed.

If the brewing machine includes a sweet meter, such as part of a user interface as described below, an operator may be able to adjust the amount of sweetener that may be added. Different settings may be provided through the sweet meter. In an embodiment of the present disclosure, setting #1 may provide the least or weakest amount of sweetener while setting #10 may provide the most or strongest amount of sweetener. In other embodiments of the present disclosure, the operator may be presented with plus/minus selectors so that he/she may selectively increase or decrease the amount or intensity of sweetener being contributed to the brewed still beverage. It should be appreciated that any number of sweetener settings and means for adjusting the intensity of the sweetener may be provided without departing from the present disclosure. Similarly, if a flavoring or other additive is being delivered to the brewing machine and/or dispenser, the brewing machine may include a flavoring or additive meter to selectively adjust the amount or intensity of the flavoring or additive according to embodiments of the present disclosure.

In some embodiments of the present disclosure, other flavorings may be added to the sweetener that may be dispensed through the sweetener line. In these embodiments, the flavorings and sweeteners may be pre-combined in a single tank or container for delivery into the brew basket and/or into the dispenser through the sweetener line. However, there may be other embodiments wherein the flavorings and/or sweeteners may be separately housed in different tanks or containers, each with a feed line into the brew basket and/or dispenser. Flavorings may include but are not limited to fruit flavoring, milk flavoring, chocolate flavoring, cream flavoring, and/or other taste-improving additives. It should be appreciated that there may be embodiments of the present disclosure wherein more than one flavoring and/or sweetener may be incorporated as part of brewed lemonade.

In some embodiments of the present disclosure, the brewing machine may include one or more user interfaces that may be disposed on the housing of the brewing machine (see FIG. 1). The user interface may be a touch screen interface, a display with predetermined user selection controls, and combinations of the same. Controls on the user interface may be used to control the amount of hot water that may be delivered to the brew basket. Controls also may be used to control when and how sweetener is added to the brew basket and/or to the dispenser receiving the brewed still beverage. This user interface may include one or more input mechanisms and/or a display screen, such as an LCD for digital readout. The user interface may include standardized inputs or the inputs may be customizable without departing from the present disclosure. In some embodiments of the present disclosure, the user interface may include an on/off switch such that brewing may be started and stopped at the operator's discretion. The user interface also may include means to select different brew cycle settings, such as a half batch or a full batch, according to some embodiments of the present disclosure. The user interface may further include a brew counter that may keep track of how many batches have been brewed over a specified period of time. In some embodiments of the present disclosure, the user interface of the brewing machine may include features such as quick or standard brew, energy savings modes, and/or sweetener with low product detection.

A brewing machine utilized according to embodiments of the present disclosure may be configured with certain default settings, including but not limited to different recipes, temperature settings, sweetener settings, flavor settings, and water distribution/amount settings. For example, there may be embodiments of the present disclosure wherein a still beverage may be brewed at the same temperature each time. In such embodiments, the brewing machine may be preprogrammed to commence the still beverage brewing process when water being supplied to the brewing machine has been heated to a specified temperature. It should be appreciated that there may be some embodiments of the present disclosure wherein the brewing machine may be equipped with a brew lockout function that may prevent brewing if the water temperature is lower than the specified temperature.

In some embodiments of the present disclosure, the user interface of the brewing machine may include different recipe buttons or input mechanisms and full/half brewing options for maximum flexibility. When referring to recipe buttons or input mechanisms, it should be appreciated that different still beverage recipes may be programmed or loaded into the brewing machine to adapt for different levels or types of sweetener or flavoring that may be included in the lemonade being brewed. The recipes may be named within the brewing machine such that a user may scroll through the recipe names or input an identifying feature of the desired recipe in order to select the desired still beverage recipe to be brewed. In other embodiments of the present disclosure, different flavors of a still beverage, such as lemonade, may be brewed, and accordingly, a recipe may be selected to provide for a different brew temperature, different flavoring, amount of pulp, and/or a different amount of sweetener without departing from the present disclosure. In other embodiments of the present disclosure, the brewing machine operator may manually add the sweetener, pulp and/or flavoring without utilizing a recipe input. Similarly, the operator may manually set the brewing temperature without departing from the present disclosure. It also should be appreciated that a brewing machine may include one or more buttons or input mechanisms where an operator may manually program these settings without departing from the present disclosure. When an operator selects a recipe, the brewing machine may allow the user to review each of the brew settings associated with that recipe. Brew settings may include but are not limited to brew temperature, brew ounces, dilution ounces, dilution delay time, sweetener, pulp, and flavoring according to embodiments of the present disclosure. It should be appreciated that the brewing machine may include plus/minus or other similar selectors so that an operator may adjust the number of brew ounces outside of a recipe selection without departing from the present disclosure. This may allow for changes in the size or the dispenser or reservoir receiving the finished product and/or the amount of brewed still beverage that may be needed at a given time according to embodiments of the present disclosure.

In some embodiments of the present disclosure, the brewing machine may include a freshness timer that an operator may use to establish an expiration time for the brewed still beverage. The freshness timer may include a programmable range such that an operator may establish how the brewed still beverage may remain in the vessel or reservoir before a new batch should be brewed. It should be appreciated that there may be embodiments of the present disclosure wherein the brew machine may have a default time set for a brewed still beverage. However, there may be other embodiments of the present disclosure wherein the freshness or expiration time may be variable, for example, depending on whether any preservatives have been included in the finished product. It also should be appreciated that the freshness setting may result in a notification being made to the operator when the amount of time has passed so that the operator may discard the finished product remaining in the dispenser or reservoir. In other embodiments of the present disclosure, expiration of the freshness timer may result in a new batch being brewed into the dispenser or reservoir already containing the finished product (i.e., not discarding the remaining product before the new batch is brewed). It should be appreciated that the freshness timer may automatically reset after some action has been taken in response to its expiration (i.e., discarding the remaining product or setting the brew machine to brew a new batch) or the timer may be manually reset without departing from the present disclosure.

Figure 5:
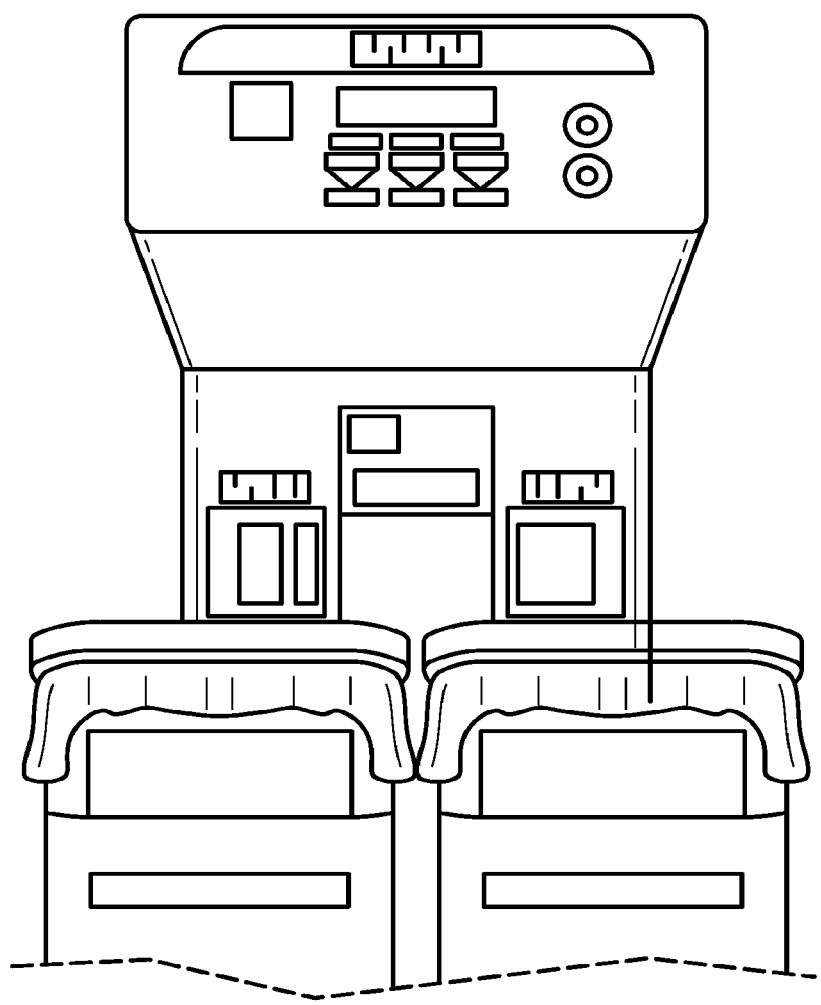
FIG. 5 depicts a double-dispenser system for receiving a brewed still beverage according to an embodiment of the present disclosure.

It should be appreciated that a brewing machine may include more than one dispenser or reservoir to receive the still beverage as it is brewed without departing from the present disclosure. FIG. 5 depicts a double-dispenser system for receiving a brewed still beverage according to an embodiment of the present disclosure. Different or similar types of a brewed still beverage may be brewed into each dispenser according to embodiments of the present disclosure. A brewing machine employed with a double-dispenser system may typically be used when a beverage that may be sweetener (such as sweetened iced tea or coffee) may be received in one dispenser and an unsweetened beverage (such as unsweetened iced tea or coffee) may be received in the second dispenser. In embodiments of the present disclosure, it should be appreciated that a single user interface or more than one user interface may be employed to change the settings for brewing into each dispenser or reservoir without departing from the present disclosure. For example, the user interface may include a Brew A input when a first reservoir is to receive the still beverage as it is brewed and a Brew B input when a second reservoir is to receive the still beverage as it is brewed. It should be appreciated that this may be used when different recipes for a brewed still beverage may be employed. In an embodiment of the present disclosure, a flavoring, such as a fruit flavoring, may be incorporated into the brewed lemonade received by one reservoir and non-flavored brewed lemonade may be received by another reservoir. Similarly, one reservoir may receive a more highly sweetened brewed lemonade than the other reservoir without departing from the present disclosure. There also may be embodiments of the present disclosure wherein an operator may rotate the brew basket of the brewing machine toward one dispenser or the other depending on which type of still beverage is to be brewed.

It should be appreciated that the brewing machine may brew into different types of dispensers, serving devices, reservoirs and/or urns according to embodiments of the present disclosure. The type of vessel that may receive the brewed lemonade may vary depending on the type of brewing machine being employed. It also should be appreciated the volume of a still beverage that may be brewed into the vessel may vary depending on the capacity of the brewing machine.

Once the still beverage has been brewed, in some embodiments of the present disclosure, the brewed still beverage may be ready to be consumed without further action by the brewing system operator. However, there may be some embodiments of the present disclosure where the operator may open the dispenser and mix/stir the brewed still beverage, for example, so that the sweetener may be more evenly distributed throughout the dispenser prior to service. In some embodiments of the present disclosure, once the still beverage has been brewed within the dispenser, the dispenser may be covered and moved to a designated serving location if it is not to remain in proximity of the brewing machine.

It should be appreciated that brewing systems and methods according to embodiments of the present disclosure may be scalable relative to the dispenser or reservoir that may be receiving the brewed still beverage or the type of brewing machine that may be employed.

It also should be appreciated that while certain embodiments of the present disclosure have been described with respect to brewing lemonade, the methodology described herein may be applicable to preparing or brewing other still beverages, including, but not limited to, fruit drinks, isotonics, coconut water, and horchata, without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for brewing multiple servings of a still beverage other than coffee in a brewing machine already in use in a commercial environment to brew tea or coffee, the method comprising:
adding a pre-prepared still beverage mixture placed into a paper flow-through mechanism to a brew basket within the brewing machine, wherein the paper flow-through mechanism directly contacts a bottom of the brew basket, the brew basket having a funnel positioned over a reservoir internal to the brewing machine;
adding a first sweetener to the brew basket via a sweetener line that is connected to the brew basket and coupled to a first sweetener reservoir; and
flowing water through the paper flow-through mechanism including the pre-prepared still beverage mixture, wherein the still beverage formed from combining the pre-prepared still beverage mixture, the first sweetener, and water fully evacuates the brew basket through the funnel and enters the reservoir internal to the brewing machine,
wherein the pre-prepared still beverage mixture is in a slurry form before being added to the brew basket.

2. The method of claim 1 further comprising:
adding one or more additional components to the still beverage as it enters the reservoir, the one or more additional components selected from the group comprising:
sweeteners, flavorings, fruit, and pulp.

3. The method of claim 1 wherein the pre-prepared still beverage includes one or more additional components selected from the group comprising:
sweeteners, flavorings, fruit, and pulp.

4. The method of claim 1 wherein the still beverage is lemonade.

5. The method of claim 4 wherein the pre-prepared still beverage mixture is comprised of juice from lemons and water.

6. The method of claim 1 wherein the still beverage is selected from the group comprising:
lemonade, a fruit drink, a flavor-infused water, an isotonic, and horchata.

7. The method of claim 1, wherein the funnel is inserted into funnel rails positioned over the reservoir internal to the brewing machine.

8. The method of claim 1, wherein the still beverage comprises a homogenous mixture that contains multiple servings of the still beverage obtained by using the pre-prepared still beverage mixture.

9. The method of claim 1, wherein the pre-prepared still beverage comprises fruit, infused water, or both fruit and infused water.

10. The method of claim 1, further comprising:
during the step of adding, adjusting an amount of the first sweetener that is added via the sweetener line.

11. The method of claim 1, wherein the sweetener line is additionally coupled to a water supply line, the method further comprising:
drawing the first sweetener from the first sweetener reservoir to combine with water from the water supply line via a pressurized water feed.

12. The method of claim 11, wherein the first sweetener is in a liquid form, a powder form, or a syrup form.

13. The method of claim 12, wherein the pre-prepared still beverage mixture comprises a pre-prepared lemonade mixture.

14. The method of claim 1, further comprising:
adjusting a sweetener type that is added to the brew basket by changing the sweetener feed line from being coupled to the first sweetener reservoir to a second sweetener reservoir.

15. The method of claim 14, further comprising:
adding a second sweetener to the brew basket via the sweetener line that is connected to the brew basket and coupled to the second sweetener reservoir.

16. The method of claim 1, further comprising:
prior to adding the first sweetener to the brew basket via the sweetener line, combining a flavoring with the first sweetener.

17. The method of claim 16, wherein the flavoring comprises a fruit flavoring.

18. The method of claim 1, further comprising:
controlling when the first sweetener is added to the brew basket.

19. A method for brewing multiple servings of a still beverage other than coffee in a brewing machine already in use in a commercial environment to brew tea or coffee, the method comprising:
adding a pre-prepared still beverage mixture placed into a paper flow-through mechanism to a brew basket within the brewing machine, wherein the paper flow-through mechanism directly contacts a bottom of the brew basket, the brew basket having a funnel positioned over a reservoir internal to the brewing machine;
adding a first sweetener to the brew basket via a sweetener line that is connected to the brew basket and coupled to a first sweetener reservoir, wherein the first sweetener is in a liquid form, a powder form, or a syrup form, wherein the sweetener line is additionally coupled to a water supply line;
drawing the first sweetener from the first sweetener reservoir to combine with water from the water supply line via a pressurized water feed; and
flowing water through the paper flow-through mechanism including the pre-prepared still beverage mixture, wherein the still beverage formed from combining the pre-prepared still beverage mixture, the first sweetener, and water fully evacuates the brew basket through the funnel and enters the reservoir internal to the brewing machine,
wherein the pre-prepared still beverage mixture comprises a pre-prepared lemonade mixture, and wherein the pre-prepared lemonade mixture comprises lemons and water in a gelatinized form.

20. The method of claim 19, further comprising:
adjusting a sweetener type that is added to the brew basket by changing the sweetener feed line from being coupled to the first sweetener reservoir to a second sweetener reservoir.

* * * * *